(No Model.)
R. S. VAN ZANDT.
SUPPORT FOR FIRE HOSE.
No. 305,490. Patented Sept. 23, 1884.
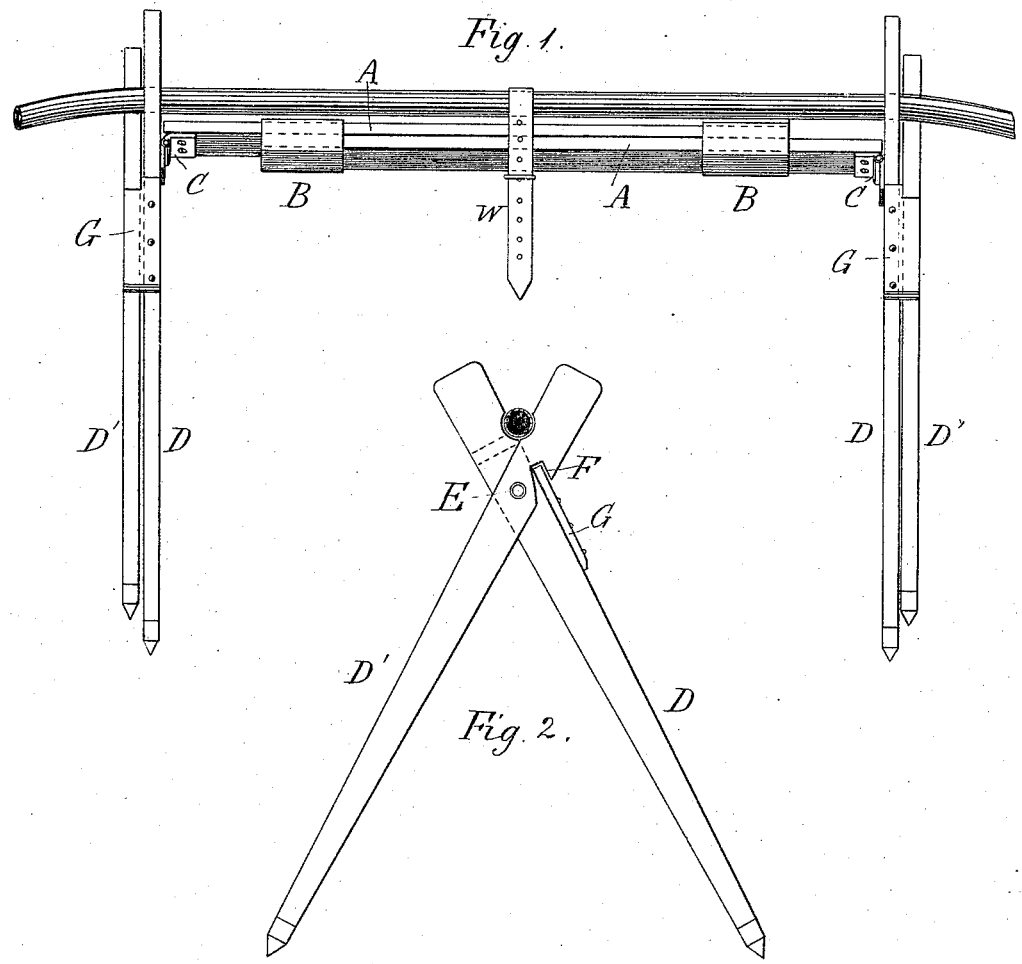
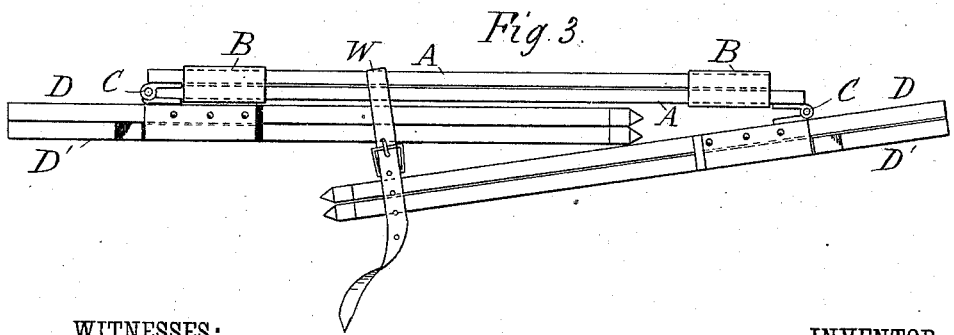
WITNESSES:
Wm. A. Lowe
H. W. Hubbard.
INVENTOR
Robert S. Van Zandt
BY Geo. W. Morrill
ATTORNEY

UNITED STATES PATENT OFFICE.

ROBERT S. VAN ZANDT, OF BROOKLYN, NEW YORK.

SUPPORT FOR FIRE-HOSE.

SPECIFICATION forming part of Letters Patent No. 305,490, dated September 23, 1884.

Application filed February 4, 1884. (No model.)

*To all whom it may concern:*

Be it known that I, ROBERT S. VAN ZANDT, of Brooklyn, in the county of Kings and State of New York, have invented new and useful Improvements in Supports for Fire-Hose, of which the following is a full, clear, and exact description, reference being had to the accompanying drawings, and to the letters of reference marked thereon.

My invention relates especially to apparatus for supporting fire-hose in an elevated position, so as not to obstruct street-car traffic, &c., and has for its object the production of a device cheap and simple to construct, easy to place in position, and which may be folded together, occupying but a small space when not in use.

My invention consists, essentially, in a double parallel bar the two portions whereof are arranged to slide over each other in a lateral direction, in combination with folding shears hinged to said bar at each extremity, and so arranged as to hold the double bar in an elevated position, forming crotches at each end thereof over which the hose may be passed, leaving ample space therebeneath for the passage of street-cars, either a single or double line, for wagons, &c., whereby traffic is not obstructed and the hose is preserved from injury.

In the drawings, Figure 1 is a side elevation of my device, and Fig. 2 is an end elevation. Fig. 3 shows the support as folded together.

Like letters of reference, wherever they occur, indicate corresponding parts in all the figures.

A A are the two parts of the horizontal extensible bar, a clasp, B, being affixed to the end of each part in such a manner as to hold them snugly together while permitting lateral movement. At the free end of each bar is a hinge, C, secured thereto and to the blade D of the shears. Blade D' is pivoted to blade D at E, and is provided with a notch, F, wherein a catch-block, G, engages when the shears are opened, said catch being secured to blade D.

H are hose passing over the supports, being held in place in the crotches formed by the upper extremities of the shears and by strap W at the center.

When constructed in accordance with the foregoing description, my improved support will be found to be admirably adapted to the uses and purposes for which it is intended. When not in use it may be folded together, as shown in Fig. 3, and placed upon a truck.

In use, the double bar is first set to the proper width, the shears are opened as wide as the catches will permit, and are drawn outward. The upper portions of blades D rest against the ends of the horizontal bars in such a manner as to throw the pointed bottoms of the blades a little outward, thus securely bracing the whole device and forming an ample support for the hose when passed thereover.

Having now fully described my invention, what I claim as new therein, and desire to secure by Letters Patent, is—

1. A support for fire-hose, consisting of an extensible double bar, in combination with folding shears united to the extremities of said bar, substantially as shown and described.

2. In a support for fire-hose of the character herein specified, the shears consisting of blades D and D', provided with a catch-block, G, and notch F, substantially as shown and described.

3. In a support for fire-hose, the combination, with the horizontal bar, of the shears consisting of blades D and D', provided with a notch, F, and catch-block G, substantially as shown and described.

4. In a support for hose, double bar A A held in place by clasps B B, the shears having blades D and D', catch-blocks G, and notches F, said shears being secured to the extremities of the bar by hinges C, the whole combined and arranged to be folded together, substantially as shown and described.

In testimony that I claim the foregoing I have hereunto set my hand in the presence of two witnesses.

ROBERT S. VAN ZANDT.

Witnesses:
G. W. GREEN,
GEO. W. MORRILL.